United States Patent Office

2,927,907
SILOXANE ELASTOMERS

Keith E. Polmanteer, Midland, Mich., assignor to Dow Corning Corporation, Midland, Mich., a corporation of Michigan No Drawing. Application January 7, 1957
Serial No. 632,630

10 Claims. (Cl. 260—37)

This invention relates to room temperature curing siloxane elastomers.

This application is a continuation-in-part of applicant's copending application Serial No. 411,281, filed February 18, 1954, now abandoned.

Ever since the advent of organosiloxane rubbers attempts have been made to produce a commercially satisfactory elastomeric siloxane material which could be cured at room temperature. The advantages of such a material are many. For example, it reduces the cost of fabrication in that no heating is required. It removes any limitations as to the size of the article being fabricated since there is no necessity for heating. Also, it allows siloxane elastomers to be employed for uses in which artificial heating is impractical or impossible, for example, in the calking of voids in buildings, automative vehicles or in large electrical equipment.

The best previously known room temperature curing siloxane elastomers were those described in U.S. Patent 2,571,039. These materials were prepared by incorporating alkyl silicates into acid polysiloxanes, that is, polymeric siloxanes which had acid groups such as sulphate and phosphate groups in the siloxane polymer. Whereas such materials were suitable for many uses they are not suitable for uses where a corrosion problem exists. Consequently, there was need for a satisfactory room temperature curing elastomer which would not contain corrosive materials.

It is an object of this invention to prepare a room temperature curing siloxane elastomer which is substantially free from bubbles in the cured state. Another object is to prepare a suitable electrical potting compound. Another object is to provide siloxane elastomers having stress-strain properties higher than any previously known siloxane elastomer. Another object is to prepare a calking compound suitable for use in applications where no heat can be applied. Another object is to provide a self-curing coating composition. Other objects and advantages will be apparent from the following description.

This invention relates to a room temperature curing composition of matter consisting essentially of (1) an organopolysiloxane of at least 100 cs. viscosity at 25° C., said siloxane being composed of polymer units of the formula

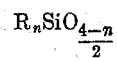

where R is of the group monovalent hydrocarbon radicals and halogenated monovalent hydrocarbon radicals and $n$ has an average value from 1.99 to 2 inclusive, (2) from .1 to 50% by weight based on the weight of the siloxane of a hydrocarbonoxy silicate in which the hydrocarbon radicals are monovalent aliphatic hydrocarbon radicals of less than 8 carbon atoms, and (3) from .01 to 10% by weight based on the weight of the polysiloxane of a carboxylic acid salt of metals ranging from lead to manganese inclusive in the electromotive series of metals, in which salt the acid radicals have less than 16 carbon atoms.

The acid-free siloxanes employed in this invention can contain attached to the silicon atoms any monovalent hydrocarbon radical and any halogenated monovalent hydrocarbon radical. The term "acid-free" as employed herein means that the siloxane polymer is free of acid groups such as ≡SiAc, where Ac is, for example, Cl, —OSO₃H, —OPO₃H₂, or —OPO₃HEt. The siloxanes employed in this invention are substantially diorgano substituted siloxanes which may contain limited amounts of monoorgano substituted siloxanes. Preferably the siloxanes should be substantially free from triorganosiloxane units.

Specific examples of R groups which are operative in this invention are alkyl groups such as methyl, ethyl and octadecyl; cycloaliphatic groups such as cyclohexyl and cylopentyl; aromatic hydrocarbon radicals such as phenyl, xenyl, and naphthyl; aralkyl groups such as benzyl; alkaryl groups such as tolyl and xylyl; unsaturated hydrocarbon radicals such as vinyl, allyl and cyclohexenyl and halogenated monovalent hydrocarbon radicals such as chloromethyl, bromophenyl, tetrafluoroethyl, trifluorovinyl, trifluorotolyl, hexafluoroxylyl, heptachloroxenyl, heptafluoropropyl, chlorodifluorovinyl, chlorohexafluorocyclopentenyl, 1-bromo-3-tribromopropyl and

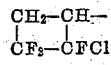

It is to be understood that the siloxanes employed herein can be either homopolymeric materials or copolymeric materials containing two or more different types of siloxane units and further that both organic radicals attached to any one silicon atom can be the same or the radicals attached to any one silicon atom can be different.

The polymeric siloxanes which are employed in this invention can range in viscosity from 100 cs. up. Thus, the polymers can be thin liquids or nonflowing benzene soluble gums or insoluble gels. The particular physical state of the polymer will vary depending upon the end use of the elastomer. Thus fluid polymers of the order of 2,000 to 25,000 cs. are preferred for those applications such as coating or potting. When excellent stress-strain properties are desired it is preferable to employ high molecular weight nonflowing soluble gums. In general, it is preferred that the polymers be soluble.

The silicates within the scope of this invention include any silicate wherein the organic radicals are the defined hydrocarbonoxy radicals. The term "silicate" as employed herein includes both orthosilicates of the formula Si(OR)₄ in which R is an aliphatic hydrocarbon radical of less than 8 and preferably less than 6 carbon atoms and partial hydrolyzates of such orthosilicates commonly known as polysilicates. These polysilicates are polymeric materials in which the silicon atoms are linked through SiOSi linkages, the remaining valences of the silicon being satisfied by OR radicals in which R is as above defined. Preferably the polysilicates are nonvolatile materials. The devolatilization may be carried out by heating the polysilicate at reduced pressure at temperatures up to 250° C.

Both the orthosilicates and polysilicates employed in this invention are commercially available materials. Specific examples of such silicates are n-propylorthosilicate, amylorthosilicate, allylorthosilicate, pentenylorthosilicate, diethyldipropylorthosilicate, hexylorthosilicate, methylpolysilicate, ethylpolysilicate, isopropylpolysilicate, secondary amylpolysilicate. and n-butylpolysilicate and mixtures thereof.

The curing of the compositions of this invention is brought about by combining the polysiloxane, the silicate and a curing catalyst comprising a carboxylic acid salt of the metals ranging from lead to manganese in the electromotive series of metals. Specifically, the metals included are lead, tin, nickel, cobalt, iron, cadmium, chromium, zinc and manganese. Any carboxylic acid salt of these metals is operative in this invention provided the carboxylic acid radical contains less than 16 carbon atoms. It is preferable that the salt be soluble in the siloxane although insoluble salts may be employed if they are properly dispersed in the system. The dispersion may be carried out by employing a solution of the catalyst in a mutual solvent with the siloxane, or the catalyst may be dispersed on a filler and thereafter milled into the siloxane.

The term "carboxylic acid salt" as employed herein includes those salts which contain hydrocarbon radicals attached to the metal, for example, dibutyl tin diacetate.

Specific examples of salts which are operative in this invention are the naphthenates of the above metals such as lead naphthenate, cobalt naphthenate and zinc naphthenate, salts of fatty acids such as iron 2-ethylhexoate, lead 2-ethylhexoate and chromium octoate, salts of aromatic carboxylic acids such as dibutyl tin dibenzoate, salts of polycarboxylic acids such as dibutyl tin adipate and lead sebacate and salts of hydroxy carboxylic acids such as dibutyl tin dilactate.

In general, the amount of catalyst employed can be varied from .01 to 10% based upon the weight of the siloxane. A mixture of two or more of the defined salts may be employed if desired. The amount of catalyst varies from compound to compound depending upon the activity of the specific compound in question and also the amount of catalyst will be varied depending upon the particular use for the product. For example, when a fast cure is desired, more catalyst is required. If one wishes to delay the cure, for example, in applications where extensive fabrication time is required less catalyst is used. In general, catalyst concentrations of from .2 to 2% based on the weight of the siloxane are sufficient.

If desired, fillers can be incorporated into the elastomers of this invention. Suitable fillers include organic materials such as cork, wood flour, cotton linters and organic fabrics or inorganic fillers such as calcium carbonate, titania, carbon black and silica powders. The latter fillers are preferred in those applications requiring high temperature stability. If employed, the amount of filler may range from 10 to 300 or more parts by weight based on the weight of the polysiloxane.

The elastomers of this invention may be compounded in the usual manner for compounding siloxane elastomers. If the materials are to be stored prior to use, it is necessary that the carboxylic acid salt or the silicate be stored separately. In other words, one may compound the polymer, filler and silicate and add the carboxylic acid salt just prior to use or one may compound the polymer, filler, and carboxylic acid salt and then add the silicate just prior to use.

The latter method is particularly valuable in coating applications where a mixture of polymer, salt, and if desired, a filler can be applied to the base member and thereafter a coating of the silicate can be applied in any convenient manner such as by brushing, spraying and the like. The silicate will diffuse into the polysiloxane coating and curing in situ will thereupon occur.

Curing of the elastomers of this invention takes place spontaneously at room temperature upon mixing the siloxane, silicate and carboxylic acid salt. The curing in general will require from one to three days at room temperature. If desired, the curing time can be increased by maintaining the mixture at a temperature below room temperature, for example, at 0° C. or the curing time can be decreased by employing elevated temperatures. It is to be understood, of course, that if desired, the elastomers of this invention can be cured in a press at temperatures of 150° C. to 250° C. The products can be hot or cold molded and extruded, although in carrying out extrusion operations care should be taken that the curing does not advance too far prior to extrusion.

The products of this invention are particularly adaptable for potting compounds. For example, a fluid polymer of say 10,000 cs. may be compounded with the silicate and, if desired, enough filler so that the material can still be poured. The catalyst may then be added and the material poured into the container whereupon it will set in a matter of a day or less to a rubbery material which will completely fill the voids in the apparatus.

The materials of this invention have heat stabilities comparable with that of previously known siloxane elastomers. This is exhibited by little reduction of physical properties after heating at 250° C. and also by low weight loss during heating. Furthermore, the stress-strain properties of some of the elastomers of this invention are far superior to those of any known siloxane elastomer.

The elastomers of this invention are useful for electrical insulation, for sealing of voids and for any other use where elastomeric products are needed.

It should be understood that the claims include within their scope nonessential ingredients such as oxidation inhibitors, compression set additives, pigments, fillers and other specialized ingredients normally employed in siloxane elastomers.

The following examples are illustrative only and should not be construed as limiting the invention which is properly delineated in the appended claims. In all of the examples the parts are parts by weight.

*Example 1*

In each of the runs of this example 100 parts by weight of a nonflowing benzene soluble dimethylpolysiloxane was milled with 50 parts by weight diatomaceous earth, 5 parts by weight of a devolatilized ethylpolysilicate, and the various catalysts in the various amounts shown in the table below. After milling the product was cold molded into a sheet and allowed to age at room temperature for the time specified. The physical properties were then determined.

| Catalyst | Amount[1] | Time in Days | Physical Properties | | |
|---|---|---|---|---|---|
| | | | D | T in p.s.i. | Percent E at Break |
| Lead 2-ethylhexoate | 1 | 1 | 46 | 583 | 383 |
| Dibutyl tin diacetate | .5 | 1 | 36 | 603 | 350 |
| Do | .2 | 1 | 40 | 446 | 340 |
| Dibutyl tin di-2-ethylhexoate | 1 | 1 | 45 | 683 | 313 |
| Do | .5 | 1 | 43 | 477 | 345 |
| Do | .2 | 1 | 33 | 532 | 525 |
| Dibutyl tin dilaurate | .1 | 1 | 46 | 578 | 270 |
| Do | .5 | 1 | 49 | 543 | 380 |
| Do | .2 | 1 | 41 | 533 | 420 |
| Butyl tin tri-2-ethylhexoate | .5 | 1 | 43 | 477 | 345 |
| Iron 2-ethylhexoate | 1 | 1 | 35 | 321 | 397 |
| Cobalt 2-ethylhexoate | 1 | 1 | 35 | 330 | 380 |
| Manganese 2-ethylhexoate | 1 | 2 | 22 | 117 | 510 |
| Zinc 2-ethylhexoate | .5 | 2 | Set to an elastomeric product. | | |

[1] Amount of catalyst is expressed in parts by weight based on the weight of 100 parts polysiloxane.

*Example 2*

100 parts of a benzene soluble dimethylpolysiloxane, 35 parts of a silica powder which had been prepared by adding trimethylchlorosilane to a silica organo gel and thereafter evaporating the volatiles at atmospheric pressure, 5 parts devolatilized ethylpolysilicate and .3 part dibutyl tin di-2-ethylhexoate were milled until a uniform mix was obtained and then cold-pressed into a flat sheet. The sheet was cut into various samples which were allowed to stand at room temperature for the times shown below and after each time the physical properties were determined as shown.

| Curing Time In Days | Physical Properties | | |
|---|---|---|---|
| | D | T in p.s.i. | Percent E at Break |
| 2 | 35 | 1,635 | 1,230 |
| 3 | 35 | 1,852 | 1,155 |
| 4 | 38 | 1,960 | 1,100 |
| 5 | 42 | 2,180 | 1,100 |
| 7 | 44 | 2,110 | 1,020 |

The above experiment was repeated except that .5 part lead 2-ethylhexoate was employed as a catalyst. The properties upon aging were as follows:

| Curing Time In Days | Physical Properties | | |
|---|---|---|---|
| | D | T in p.s.i. | Percent E at Break |
| 2 | 31 | 850 | 1,255 |
| 3 | 34 | 1,184 | 1,175 |
| 4 | 39 | 1,640 | 1,150 |
| 5 | 41 | 1,720 | 1,170 |
| 7 | 44 | 2,070 | 1,100 |

By way of comparison, the identical polymer and the identical filler in the same amounts shown above were milled with 1.5 parts of weight benzoyl peroxide and cured by heating for 5 minutes at 125° C. The properties of the vulcanized elastomer were D 42, T in p.s.i. 1320 and percent E at break 860. Thus it can be seen that the elastomers of this invention give substantially better properties than a comparable peroxide vulcanized elastomer.

Example 3

100 parts of a benzene soluble dimethylpolysiloxane, 40 parts of a fume silica, .5 part ferric oxide, 20 parts devolatilized ethylpolysilicate and 1 part lead 2-ethylhexoate were milled and cold pressed into a sheet. The properties upon aging were as follows:

| Curing Time In Days | Physical Properties | | |
|---|---|---|---|
| | D | T in p.s.i. | Percent E at Break |
| 3 | 69 | 1,114 | 650 |
| 7 | 74 | 1,081 | 620 |

Example 4

100 parts of a 15,000 cs. dimethylpolysiloxane which was made by polymerizing dimethylsiloxane cyclics with KOH.HOCH(CH$_3$)$_2$ at 150° C., 80 parts ground quartz having a particle size less than 40 microns, 3 parts ethylpolysilicate and .5 part lead 2-ethylhexoate were milled until a uniform mix was obtained. The product was then molded into test bars at elevated temperature and allowed to stand thereafter at room temperature. The properties were as follows:

| Curing Time In Days | Physical Properties | | |
|---|---|---|---|
| | D | T in p.s.i. | Percent E at Break |
| 3 | 22 | 170 | 337 |
| 7 | 22 | 215 | 370 |

After 7 days the product was heated 24 hours at 250° C. whereupon the properties were D 23, T 233 p.s.i. and percent E at break 313.

Example 5

100 parts of a 2,000 cs. viscosity polysiloxane having the composition 7.5 mol percent phenylmethylsiloxane and 92.5 mol percent dimethylsiloxane, which polymer was free of triorganosilyl end groups, 80 parts by weight of ground quartz having a particle size less than 40 microns, 3 parts of ethylpolysilicate and .5 part of lead 2-ethylhexoate were milled and then poured into a container. After 24 hours at room temperature the material had set to a rubbery elastomeric material. After the material had stood for 3 days at room temperature it was then heated 1 hour at 150° C. and 1 hour at 250° C. whereupon the weight loss was only 1.6%.

This material is suitable for use as an electrical potting compound.

Example 6

Elastomeric products are obtained when 100 parts by weight of 100,000 cs. polysiloxanes having the compositions shown below are compounded with 3 parts by weight of the polysilicates shown below and 2 parts by weight dibutyl tin diacetate and thereafter allowed to stand at room temperature.

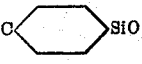

| Siloxane | Polysilicate |
|---|---|
| EtMeSiO | Methylpolysilicate. |
| Et$_2$SiO | Isopropylpolysilicate. |
| 90 mol percent Me$_2$SiO and 10 mol percent F$_3$C-C$_6$H$_4$-SiO. | Ethylpolysilicate. |
| 90 mol percent Me$_2$SiO and 10 mol percent CH$_3$-CHSiO with Me on Si and CF$_2$-CFCl substituent | Do. |
| (C$_{18}$H$_{37}$)MeSiO | Do. |
| ViMeSiO | n-Butylpolysilicate. |
| 95 mol percent Me$_2$SiO and 5 mol percent Ph$_2$SiO | Ethylpolysilicate. |

Example 7

Each of the compositions employed in this example were as follows: 100 parts of a dimethylpolysiloxane fluid of 15,000 cs. viscosity which was essentially free of trimethylsiloxy endblocks, 30 parts by weight diatomaceous earth, 0.5 part lead 2-ethylhexoate and 1.5 parts of the orthosilicates shown below. In each case the ingredients were mixed and the mixture allowed to stand 24 hours at room temperature whereupon each mixture set to a rubbery product having a durometer as indicated in the table.

Orthosilicate: Durometer
- n-Amylorthosilicate _____ 22
- Allylorthosilicate _____ 42
- n-Butylorthosilicate _____ 24
- n-Propylorthosilicate _____ 22

Each of the above compositions cured to a rubbery solid in one hour at 150° C.

That which is claimed is:

1. A cured polysiloxane elastomer obtained from a mixture of ingredients consisting essentially of (1) an organopolysiloxane of at least 100 cs. viscosity at 25° C., said siloxane being composed of polymer units of the formula $$R_nSiO_{\frac{4-n}{2}}$$

where R is selected from the group consisting of monovalent hydrocarbon radicals and halogenated monovalent hydrocarbon radicals and n has an average value from 1.99 to 2 inclusive, (2) from .1 to 50% by weight based on the weight of the siloxane of a hydrocarbonoxy silicate in which the hydrocarbon radicals are monovalent aliphatic hydrocarbon radicals of less than 8 carbon atoms, and (3) from .01 to 10% by weight based on the weight of the polysiloxane of a carboxylic acid salt of metals ranging from lead to manganese inclusive in the electromotive series of metals, in which salt the acid radicals have less than 16 carbon atoms.

2. A cured polysiloxane elastomer obtained from a mixture of ingredients consisting essentially of (1) an organopolysiloxane of at least 100 cs. viscosity at 25° C., said siloxane being composed of polymer units of the formula

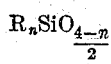

where R is selected from the group consisting of monovalent hydrocarbon radicals and halogenated monovalent hydrocarbon radicals and $n$ has an average value from 1.99 to 2 inclusive, (2) from .1 to 50% by weight based on the weight of the siloxane of a hydrocarbonoxy orthosilicate in which the hydrocarbon radicals are monovalent aliphatic hydrocarbon radicals of less than 6 carbon atoms, and (3) from .01 to 10% by weight based on the weight of the polysiloxane of a carboxylic acid salt of metals ranging from lead to manganese inclusive in the electromotive series of metals, in which salt the acid radicals have less than 16 carbon atoms.

3. A cured elastomeric composition obtained from a mixture of ingredients consisting essentially of (1) a methylpolysiloxane of at least 100 cs. viscosity, said siloxane having an average of from 1.99 to 2 inclusive methyl radicals per silicon atom, (2) from .1 to 50% by weight based on the weight of the siloxane of n-propyl-orthosilicate, and (3) from .01 to 10% by weight based on the weight of the siloxane of a carboxylic acid salt of metals of the group consisting of lead, tin and iron, in which salt the acid radicals have less than 16 carbon atoms.

4. A method of preparing siloxane elastomers which comprises mixing (1) an organopolysiloxane of less than 100 cs. viscosity at 25° C., said siloxane having a unit formula of

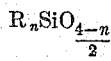

where R is selected from the group consisting of monovalent hydrocarbon radicals and halogenated monovalent hydrocarbon radicals and $n$ has an average value from 1.99 to 2 inclusive with (2) from .1 to 50% by weight based on the weight of the siloxane of a hydrocarbonoxy silicate in which the hydrocarbon radicals are monovalent aliphatic hydrocarbon radicals of less than 8 carbon atoms and subjecting the mixture to the curing action of (3) from .1 to 10% by weight based on the weight of the siloxane of a carboxylic acid salt of metals ranging from lead to manganese inclusive in the electromotive series of metals, said carboxylic acid containing less than 16 carbon atoms.

5. The method of curing a polysiloxane which comprises applying to a base member a coating of a mixture of (1) an organopolysiloxane of at least 100 cs. viscosity at 25° C., said siloxane having the unit formula

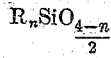

where R is of the group consisting of monovalent hydrocarbon radicals and halogenated monovalent hydrocarbon radicals and $n$ has an average value from 1.99 to 2 inclusive, (2) from .01 to 10% by weight based on the weight of the siloxane of a carboxylic acid salt of metals ranging from lead to maganese inclusive in the electromotive series of metals, said carboxylic acid containing less than 16 carbon atoms, and thereafter applying to said coating (3) from .1 to 50% by weight based on the weight of the siloxane of a hydrocarbonoxy silicate in which the hydrocarbon radicals are monovalent aliphatic hydrocarbon radicals of less than 8 carbon atoms, whereby the polysiloxane coating is cured to an elastomeric material.

6. A cured polysiloxane elastomer obtained from a mixture of ingredients consisting essentially of (1) an organopolysiloxane of at least 100 cs. viscosity at 25° C., said siloxane being composed of polymer units of the formula

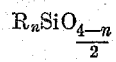

where R is selected from the group consisting of monovalent hydrocarbon radicals and halogenated monovalent hydrocarbon radicals and $n$ has an average value from 1.99 to 2 inclusive, (2) from .1–50% by weight based on the weight of the siloxane of a hydrocarbonoxy silicate in which the hydrocarbon radicals are monovalent aliphatic hydrocarbon radicals of less than 8 carbon atoms, (3) from .01 to 10% by weight based on the weight of the polysiloxane of a carboxylic acid salt of metals ranging from lead to manganese inclusive in the electromotive series of metals, in which salt the acid radicals have less than 16 carbon atoms, and (4) a silica filler.

7. A cured polysiloxane elastomer obtained from a mixture of ingredients consisting essentially of (1) an organopolysiloxane of at least 100 cs. viscosity at 25° C., said siloxane being composed of polymer units of the formula

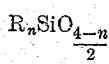

where R is selected from the group consisting of monovalent hydrocarbon radicals and halogenated monovalent hydrocarbon radicals and $n$ has an average value from 1.99 to 2 inclusive, (2) from .1 to 50% by weight based on the weight of the siloxane of a hydrocarbonoxy orthosilicate in which the hydrocarbon radicals are monovalent aliphatic hydrocarbon radicals of less than 6 carbon atoms, (3) from .01 to 10% by weight based on the weight of the polysiloxane of a carboxylic acid salt of metals ranging from lead to manganese inclusive in the electromotive series of metals, in which salt the acid radicals have less than 16 carbon atoms, and (4) a silica filler.

8. A cured elastomeric composition of matter obtained from a mixture of ingredients consisting essentially of (1) an organopolysiloxane of at least 100 cs. viscosity at 25° C., said siloxane having the unit formula

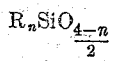

where R is selected from the group consisting of monovalent hydrocarbon radicals and halogenated monovalent hydrocarbon radicals and $n$ has an average value from 1.99 to 2 inclusive, (2) a silica filler, (3) from .1 to 50% by weight based on the weight of the siloxane of substantially nonvolatile alkyl polysilicate in which the alkyl groups have less than 6 carbon atoms, and (4) from .01 to 10% by weight based on the weight of the siloxane of a carboxylic acid salt of metals ranging from lead to manganese inclusive in the electromotive series of metals, said carboxylic acid containing less than 16 carbon atoms.

9. A cured elastomeric composition of matter obtained from a mixture of ingredients consisting essentially of (1) a methylpolysiloxane of at least 100 cs. viscosity at 25° C., said siloxane having an average of from 1.99 to 2 inclusive methyl groups per silicon atom, (2) a silica filler, (3) from .1 to 50% by weight based on the weight of the siloxane of substantially nonvolatile ethylpolysilicate, and (4) from .01 to 10% by weight based on the weight of the siloxane of a carboxylic acid salt of metals of the group consisting of lead, tin and iron, said carboxylic acid containing less than 16 carbon atoms.

10. A cured elastomeric composition of matter obtained from a mixture of ingredients consisting essentially of (1) a polysiloxane of at least 100 cs. viscosity at 25° C. having an average of from 1.99 to 2 inclusive methyl groups per silicon atom, (2) a silica filler (3) from .1 to 50% by weight based on the weight of the siloxane of n-propylorthosilicate and (4) from .01 to 10% by weight based on the weight of the siloxane of a carboxylic acid salt of metals of the group consisting of lead, tin and iron, said carboxylic acid containing less than 16 carbon atoms.

References Cited in the file of this patent

UNITED STATES PATENTS

| | | |
|---|---|---|
| 2,571,039 | Hyde | Oct. 9, 1951 |
| 2,736,721 | Dexter | Feb. 28, 1956 |
| 2,744,878 | Smith-Johannsen | May 8, 1956 |
| 2,759,904 | Talcott | Aug. 21, 1956 |
| 2,814,601 | Currie et al. | Nov. 26, 1957 |
| 2,843,555 | Berridge | July 15, 1958 |